(12) United States Patent
Goldstein

(10) Patent No.: US 6,231,122 B1
(45) Date of Patent: May 15, 2001

(54) BICYCLE SADDLE

(75) Inventor: Marc Goldstein, New York, NY (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 09/657,331

(22) Filed: Sep. 7, 2000

Related U.S. Application Data

(60) Provisional application No. 60/153,169, filed on Sep. 9, 1999.

(51) Int. Cl.$^7$ .......................................................... B62J 1/10
(52) U.S. Cl. .................. 297/195.1; 297/214; 297/215.16
(58) Field of Search ................................ 297/195.1, 202, 297/214, 215.16

(56) References Cited

U.S. PATENT DOCUMENTS

| | | |
|---|---|---|
| D. 407,910 | 4/1999 | Terry . |
| D. 412,791 | 8/1999 | Tsai . |
| 574,503 * | 1/1897 | Van Meter ............................ 297/202 |
| 576,310 | 2/1897 | Henderson . |
| 581,464 | 4/1897 | Hollenbeck ........................... 297/202 |
| 594,451 | 11/1897 | Wheeler . |
| 621,607 * | 3/1899 | Holden ................................. 297/202 |
| 660,215 * | 10/1900 | Harmon ........................... 297/202 X |
| 3,185,522 | 5/1965 | Faulhaber . |
| 4,218,090 | 8/1980 | Hoffacker et al. . |
| 4,898,422 | 2/1990 | West, III . |
| 5,011,222 | 4/1991 | Yates et al. ........................... 297/214 |
| 5,203,607 | 4/1993 | Landi . |
| 5,558,396 | 9/1996 | Yu ................................... 297/195.1 X |
| 5,645,315 | 7/1997 | Walker et al. . |
| 5,765,912 | 6/1998 | Culbertson . |
| 5,904,396 | 5/1999 | Yates ................................. 297/195.1 |
| 6,106,059 | 8/2000 | Minkow et al. ................. 297/215.16 |

FOREIGN PATENT DOCUMENTS

1400213 * 4/1965 (FR) .................................. 297/195.1

* cited by examiner

*Primary Examiner*—Peter R. Brown
(74) *Attorney, Agent, or Firm*—Boyle, Fredrickson, Newholm, Stein & Gratz; James F. Boyle

(57) ABSTRACT

A bicycle saddle including a contoured upper seating surface that primarily supports the rider's ischeal tuberosities and further including a depressed, extremely soft central anterior portion to reduce pressure placed on the perineum is disclosed. The saddle is essentially constructed from a shell, foam padding, a self-contained gelatin pack, a leather cover, and a suspension rail for mounting the saddle onto a bicycle. The seating surface of the saddle includes laterally spaced apart right and left cup-shaped posterior support surfaces for supporting primarily the right and left ischeal tuberosities in the buttocks of the bicycle rider. The right and left posterior support surfaces are formed by a pair of essentially concave depressions in the posterior portion of the shell of the saddle, and corresponding cup-shaped depressions in the foam padding covering the shell. The bicycle saddle further includes a gelatin pack in the center of the anterior portion of the saddle to provide an extraordinarily soft seating surface in the area where the rider's perineum normally rests.

3 Claims, 4 Drawing Sheets

BICYCLE SADDLE

RELATED APPLICATIONS

This application is based on a provisional application, Ser. No. 60/153,169, filed on Sep. 9, 1999, and applicant accordingly claims priority under Title 35 of the United States Code, Section 119(e)(1).

BACKGROUND OF THE INVENTION

1. Field of the Invention

The present invention relates generally to bicycle saddles and more particularly to a saddle that includes a contoured upper seating surface that primarily supports the rider's ischeal tuberosities and thereby reduces the pressure placed on the perineum.

2. Background of the Related Art

The shape of modem performance oriented bicycle saddles are generally horizontal in profile with a narrow front end portion and a wider rear portion with a concave intermediate portion for inner thigh clearance while riding. Most modem high performance saddles consist of a rigid or semi-rigid molded plastic or nylon shell over which a padded leather, plastic or vinyl cover is fitted. The use of these materials in modem saddles has resulted in a lighter, more durable and more appealing saddle than those of even a few years ago, but the seat contours have remained substantially the same.

The desired characteristics of a good high performance or competitive saddle include minimal weight, moderate stiffness, good comfort, and a functional outer surface contour that aids the rider's performance during competitive cycling.

A traditional road saddle design is generally comprised of a plastic shell, padding, a seat cover, and a suspension rail for mounting the saddle on the bicycle. The saddle disclosed in U.S. Pat. No. 5,765,912 is a typical example. The rail is made from a piece of relatively thick metal wire (e.g., about ¼ inch diameter), bent into a complex shape. The rail is attached to the shell by inserting it under a moderate preload compression into sockets molded into the forward and rear edges of the shell. Foam padding is applied to the outer surface of the shell, and the cover, usually leather, is applied over the padding. The preload secures and stiffens the shell. The rails are slightly longer than the maximum distance between the front sockets, causing the rails to deflect slightly when they are seated into the sockets. The rider's pelvis normally bears on the saddle near the center when viewed from the side view. The padding deforms elastically to provide a cushion for the rider, and the shell elastically deforms a small amount under this load to provide additional cushioning.

A recent trend in the art has been the manufacture of extremely lightweight racing saddles that make extensive use of advances in materials technology to achieve a reduced overall weight. These saddles typically employ a lightweight perforated resin nylon base shell, which is mated to a pair of titanium rails arranged along the underside shell (or base) surface in the conventional manner. The top surface of the nylon-based shell is provided with dense foam padding and a cover stretched thereover and secured to the underside of the shell. A common problem with these and similar saddle designs is the tendency of the saddle rails to sag or bend after extensive use thereby producing an upwardly-bowed bend on the upper surface of the saddle shell. This causes extreme discomfort to the rider as the contact points of the pelvic bones ride on the hard surface of the shell.

The saddle must also adequately support and distribute the load associated with the pressure points of the rider's lower pelvis region on the saddle surface to ensure rider comfort for prolonged periods of use. While most modem day saddle manufacturers take advantage of advances made in plastics, composites and metallurgy for designing a saddle which is both lightweight and comfortable, compromises are usually made to one or more of the desired characteristics of the ideal performance saddle.

Accordingly, a bicycle saddle providing better support for the rider to both increase riding comfort and reduce fatigue is desired.

SUMMARY OF THE INVENTION

A bicycle saddle that includes a novel contoured upper seating surface that primarily supports the rider's ischeal tuberosities and further includes a depressed, extremely soft central anterior portion to reduce pressure placed on the perineum is disclosed. The saddle is essentially constructed from a shell formed by a wire support structure, foam padding, a self-contained gelatin pack, a leather cover, and a suspension rail for mounting the saddle onto a bicycle. The wire support structure, gelatin pack, padding and cover are fabricated in especially novel shapes and are assembled in an especially novel fashion so as to produce the desired contour for the seating surface for the rider.

In particular, the seating surface of the saddle includes laterally spaced apart right and left cup-shaped posterior support surfaces for supporting primarily the right and left ischeal tuberosities in the buttocks of the bicycle rider. The right and left posterior support surfaces are formed essentially by a pair of concave depressions in the posterior portion of the shell of the saddle, and corresponding concave depressions in the foam padding covering the shell.

The bicycle saddle disclosed herein further includes a gelatin pack in the center of the anterior portion of the saddle to provide an extraordinarily soft seating surface in the area where the rider's perineum normally rests.

The novel bicycle saddle disclosed herein therefore provides a seating surface for supporting the rider's weight on the area of the body that is substantially more comfortable to the rider than prior art saddles, thereby reducing rider fatigue. Other objects and advantages of the invention will be apparent to those skilled in the arts of bicycle riding and bicycle design.

BRIEF DESCRIPTION OF THE DRAWINGS

The drawings, which constitute a part of the disclosure and illustrate an exemplary embodiment of the present invention, include the following.

DETAILED DESCRIPTION OF THE PREFERRED EMBODIMENTS

The following detailed description illustrates the invention by way of example, not by way of limitation of the principles of the invention. This description will clearly enable one skilled in the art to make and use the invention, and describe the preferred embodiment of the invention, including what is presently believed to be the best mode of carrying out the invention.

Figure 1:
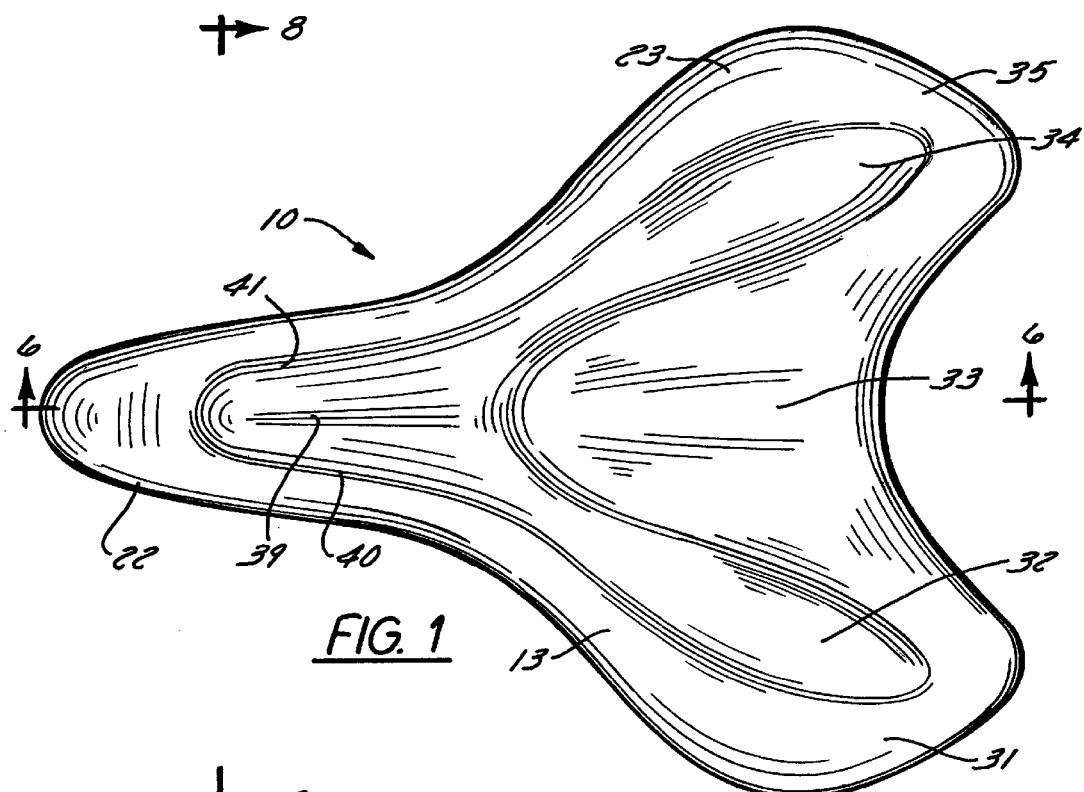
FIG. 1 is a top view of the bicycle saddle.
Figure 2:
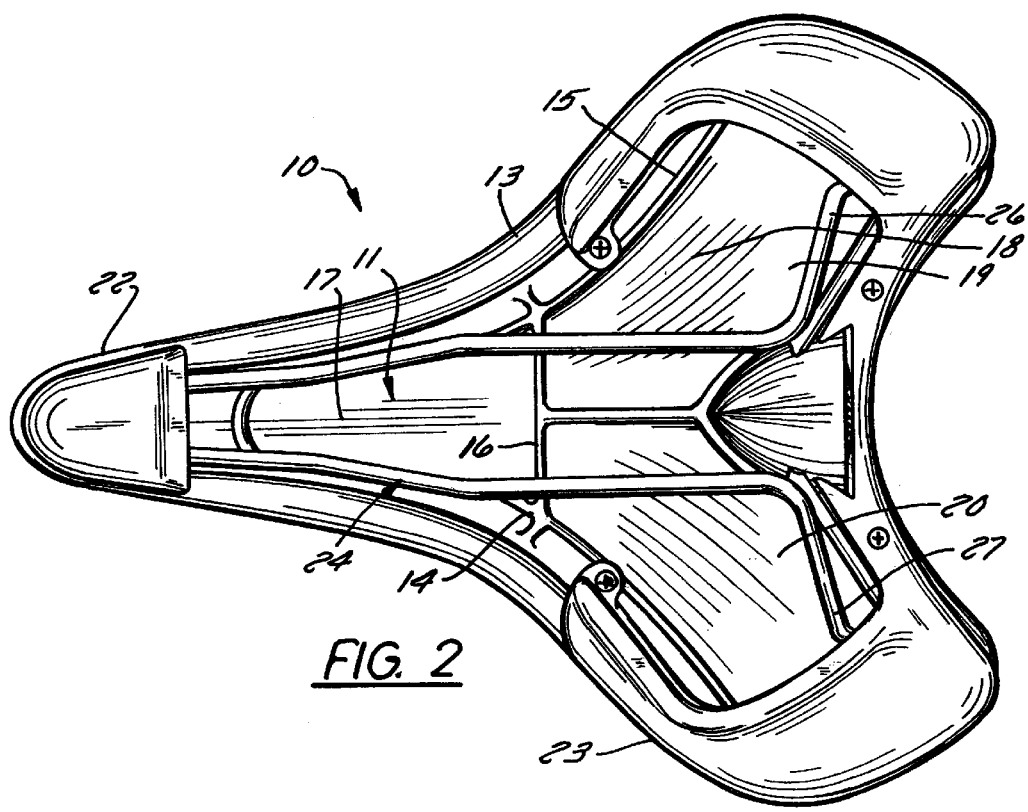
FIG. 2 is a bottom view of the bicycle saddle.
Figure 3:
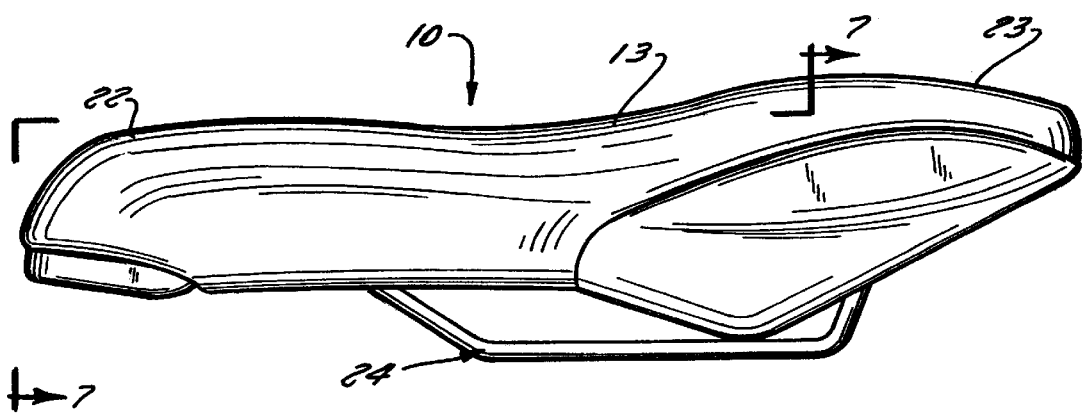
FIG. 3 is a side view of the left side of the bicycle saddle, with right side being a mirror image of FIG. 3.
Figure 4:
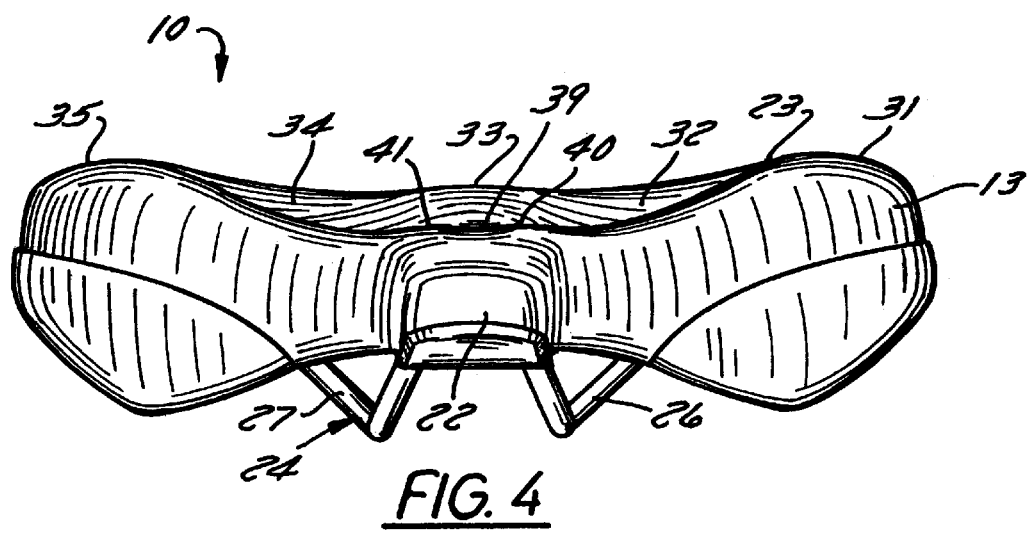
FIG. 4 is a front view of the bicycle saddle.
Figure 5:
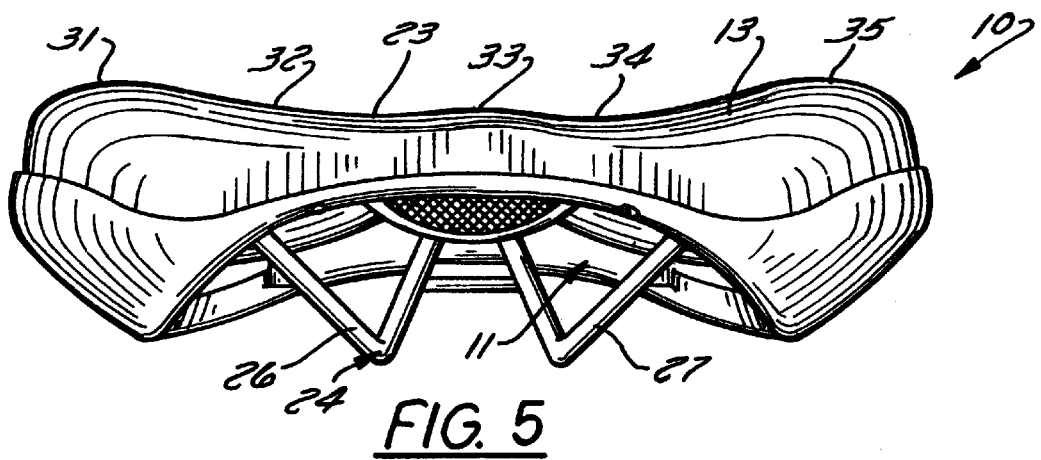
FIG. 5 is a rear view of the bicycle saddle.
Figure 6:
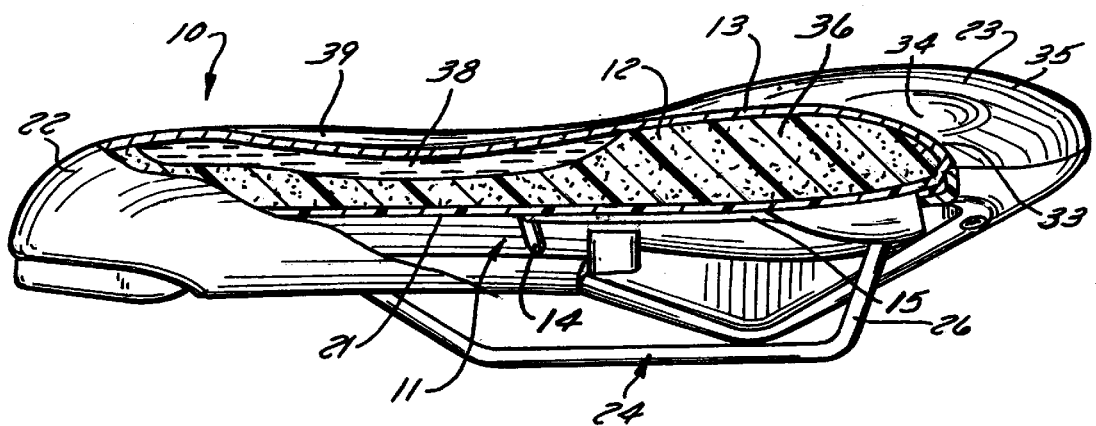
FIG. 6 is a partial sectional view of the bicycle saddle taken along line 6—6 of FIG. 1.
Figure 7:
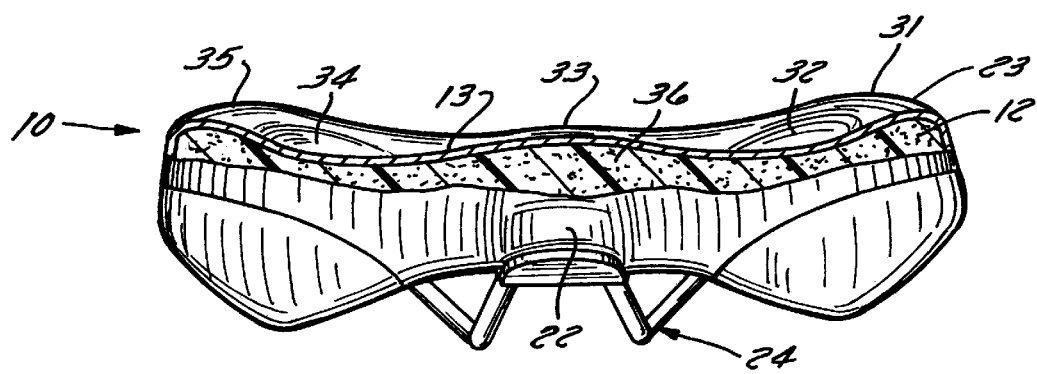
FIG. 7 is a partial sectional view of the bicycle saddle taken along line 7—7 of FIG. 3.
Figure 8:
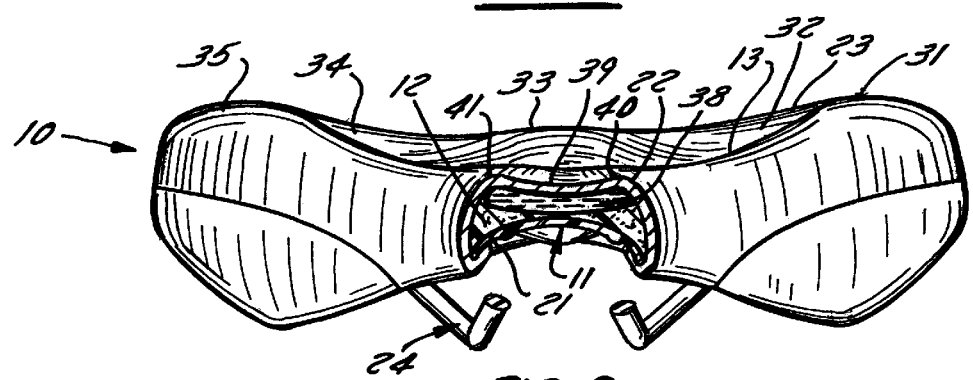
FIG. 8 is a partial sectional view of the bicycle saddle taken along line 8—8 of FIG. 1.

A bicycle saddle constructed in accordance with of the present invention is shown in FIGS. 1–8 and generally designated as numeral 10. The saddle 10 is preferably constructed in accordance with known manufacturing techniques in that it consists of an underlying shell 11 having a dense foam padding 12 placed along the upper surface of the shell and a cover material 13, stretched over the padding and secured to the underside of the shell. The upper surface of the cover 13 of course provides the seating surface that the rider sits on.

The underlying shell 11 may be fabricated out of injection molded polypropylene, polyurethane, ABS co-polymer or other like plastic material in a monocoque construction. The density and molecular weight of the selected plastic should be sufficiently high to provide a relatively rigid construction. The shell preferably permits some flexure at applied pressure points, yet should not be so flexible so as to promote fatigue, inefficiency or inadequate support.

Alternatively, and indeed preferably, the shell may be fabricated from a wire web support structure 14 for supporting the padding. The wire web support structure 14 is comprised of an outer perimeter 15, which essentially defines the outer profile of the bicycle saddle, and interior crossbars 16 sub-dividing the structure into an anterior portion 17 and a posterior portion 18. The posterior portion 18 of the wire web support structure 14 is preferably further divided into a right posterior portion 19 and a left posterior portion 20. The anterior portion 17 and the right and left posterior portions 19 and 20 are essentially open spaces in the wire web support structure. The open spaces are covered with a plastic membrane 21. The wire web support structure 14 in combination with the plastic membrane 21 provide structural support for the seating surface, described further below, and a degree of flexibility in the critical areas of the seating surface that correspond to the rider's ischeal tuberosities and perineum.

The saddle 10 has a relatively narrow anterior portion or front part 22, commonly referred to as the "nose," which becomes progressively narrower towards its front end. The saddle 10 further comprises a relatively wide posterior portion or rear part 23 to form the seat. Without limiting the invention to specific dimensions, the nose is preferably about 2 inch to 2½ inches wide, and in any event, the nose is of a size and shape which fits comfortably between the crotch of a bicycle rider; the rear part of the saddle is preferably about 8 to 9 inches wide, and in any event the rear part is of a size and shape suitable for supporting the buttocks of a rider; the overall length of the saddle is preferably about 10 to 12 inches.

The bicycle saddle 10 further comprises a suspension rail 24 for attaching the saddle to the bicycle. Specifically, the rail 24 comprises a substantially V-shaped metal wire that has been bent in order to form a forward portion 24 that is attached underneath the nose of the saddle. The tips of the wire form a first rear end 26 and second rear end 27 of the wire, which are attached under the rear part of the saddle. The forward portion 25 of the rail 24 is attached to the wire web support structure 14 underneath the nose 22 of the saddle, and the rear tips of the rail 26 and 27 are attached to the wire web support structure 14 underneath the rear part 23 of the saddle. The first and second rear tips of the rail, 26 and 27, are preferably inserted into the first and second rear sockets that are attached to the rear portion of the wire web support structure, respectively.

As mentioned, the posterior portion 23 of the bicycle saddle is contoured to provide a pair of somewhat cup-shaped, or concave, depressions. Specifically, and looking for example at FIGS. 4, 5, 7 and 8, the posterior portion 23 of the bicycle saddle includes an extreme left raised portion 31, a left concave depression 32, a raised central portion 33, a right concave depression 34, and a raised extreme left portion 35. The left and right concave depressions 32 and 34 are preferably laterally spaced apart from each other by about 4 to 5 inches, and preferably about 4½ inches. The posterior portion of the wire web support structure 14 and plastic membrane 21 is covered with foam padding 36 having a contoured upper surface corresponding to the contours described above.

The bicycle saddle further includes in the anterior portion a soft gel pack 38. The gel pack 38 is positioned in the central portion 39 of the anterior portion 22 of the bicycle saddle. Further, the gel pack 38 is positioned slightly lower than the extreme left side 40 and extreme right side 41 of the anterior portion 22 of the saddle. Consequently, directly above the gel pack 38, which is in the central portion 39 of the anterior portion 22 of the saddle, the seating surface is again depressed a slight amount, thereby reducing pressure placed on the rider's perineum.

The bicycle saddle disclosed above provides a novel contoured seating surface which, as mentioned, supports primarily the bicycle rider's ischeal tuberosities, and thereby reduces the amount of pressure applied by the rider's weight onto the perineum area. Specifically, the right and left posterior support surfaces are especially designed for supporting primarily the right and left ischeal tuberosities of the bicycle rider, respectively. Additionally, the gel pack in the anterior portion of the saddle reduces the amount of pressure placed on the central portion of the rider's pelvis particularly in the area of the perineum.

Although the bicycle saddle of the present invention has been described with specific reference to certain dimensional parameters, methods of coupling the suspension rail to the shell of the saddle, and so forth, alternative means may be employed so long as they perform substantially the same function in substantially the same way to achieve substantially the same result. Therefore, specific structural and functional details disclosed above are not to be interpreted as limiting the scope of the invention, but as presented herein merely to provide a basis for the claims and for teaching one skilled in the art to variously employ the present invention in any appropriately detailed manner. Changes may be made in the details of manufacture or structure of the invention without departing from the spirit of the invention, especially as defined in the following claims.

I claim:

1. A bicycle saddle for seating a bicycle rider, said bicycle rider having right and left ischeal tuberosities and a perineum, said bicycle saddle comprising:

a shell, said shell defining a relatively narrow anterior portion of the bicycle saddle which is adapted to fit between said bicycle rider's crotch, and said shell further defining a wide posterior portion of the bicycle saddle for supporting said bicycle rider's buttocks;

said shell being comprised of a wire web support structure, said wire web support structure having outer wire rails defining an outer profile of said bicycle saddle, and inner wire rails subdividing the outer profile into an anterior space and left and right posterior spaces, said spaces being covered over by a plastic support membrane;

a suspension rail for mounting said bicycle saddle to a bicycle, said rail comprising a metal wire having a first rear end, a second rear end, and a bent front portion, with the first rear end and second rear end being coupled under the posterior portion of the shell, and the bent front portion being coupled under the anterior portion of the shell;

foam padding covering the upper surface of the shell;

a cover covering over the foam padding and thereby providing a seating surface for the bicycle rider to sit on;

the posterior portion of the bicycle saddle including an extreme left raised portion, a left cup-shaped depression, a central raised portion, a right cup-shaped depression, and an extreme right raised portion of the posterior portion of the saddle; and, the anterior portion includes a soft gel pack;

wherein the right and left cup-shaped depressions in the posterior portion of the saddle define laterally spaced apart right and left posterior support surfaces for supporting the right and left ischeal tuberosities of the bicycle rider, respectively, and the gel pack in the anterior portion of the saddle defines an anterior support surface for supporting the rider's perineum.

2. A bicycle saddle for seating a bicycle rider, said bicycle rider having right and left ischeal tuberosities and a perineum, said bicycle saddle comprising:

a wire web support structure, said wire web support structure including an outer wire rail defining an outer profile comprising a relatively narrow anterior portion of the bicycle saddle which is adapted to fit between said bicycle rider's crotch and a wide posterior portion of the bicycle saddle for supporting said bicycle rider's buttocks, and said wire web support structure further including inner wire rails subdividing the outer profile into an anterior space and left and right posterior spaces, said spaces being covered over by a plastic support membrane;

a suspension rail for mounting said bicycle saddle to a bicycle, said rail comprising a metal wire having a first rear end, a second rear end, and a bent front portion, with the first rear end and second rear end being coupled under the posterior portion of the shell, and the bent front portion being coupled under the anterior portion of the shell;

foam padding covering the upper surfaces of the wire web support structure and the plastic support membrane;

a cover covering over the foam padding and thereby providing a seating surface for the bicycle rider to sit on;

the posterior portion of the bicycle saddle including an extreme left raised portion, a left concave depression, a central raised portion, a right concave depression, and an extreme right raised portion; and, the anterior portion includes a soft gel pack;

wherein the right and left concave depressions in the posterior portion of the saddle define laterally spaced apart right and left posterior support surfaces for supporting the right and left ischeal tuberosities of the bicycle rider, respectively, and the gel pack in the anterior portion of the saddle defines an anterior support surface for supporting the rider's perineum.

3. The bicycle saddle of claim 2, wherein the gel pack is positioned slightly lower than the extreme left side and extreme right side of the anterior portion of the saddle, thereby providing a slightly depressed seating surface under the rider's perineum.

* * * * *